NUMERICAL DISPLAY SYSTEM FOR A COMPUTER OR THE LIKE

Filed Dec. 23, 1966 2 Sheets-Sheet 1

INVENTORS.
KIKUO KUBO
KATSUYA SAITO

BY

Ward, Haselton, McElhannon, Orme, Brooks & Fitzpatrick
ATTORNEYS

NUMERICAL DISPLAY SYSTEM FOR A COMPUTER OR THE LIKE

Filed Dec. 23, 1966 2 Sheets-Sheet 2

INVENTORS.
KIKUO KUBO
KATSUYA SAITO
BY
Ward, Haselton, McElhannon, Orme Brooks & Fitzpatrick
ATTORNEYS United States Patent Office 3,460,097
Patented Aug. 5, 1969

3,460,097
NUMERICAL DISPLAY SYSTEM FOR A COMPUTER OR THE LIKE

Kikuo Kubo and Katsuya Saito, Kawasaki-shi, Japan, assignors to Nippon Columbia Company, Limited, Tokyo, Japan, a corporation of Japan

Filed Dec. 23, 1966, Ser. No. 604,247
Claims priority, application Japan, Dec. 30, 1965, 41/6
**Int. Cl. G11b *13/00***
U.S. Cl. 340—172.5 10 Claims

ABSTRACT OF THE DISCLOSURE

This invention relates to a numerical display system in which futile or unnecessary zero or zeros are prevented from being displayed. The numbers are displayed by means of indicator tubes. A series of switching and gate circuits are provided to permit the display of only significant zeros and to prevent the display of futile or unnecessary zeros.

Background of invention

In the case of a conventional display system of which the number of digits is three, when a calculated result is the decimal digit "5," for example, it is displayed as "005." In the case of written form numbers, however, the two zeros in the more significant digits of "005," for example, are not actually written. Such zeros will be referred to as invalid or unnecessary zeros hereinafter. Display of such invalid or unnecessary zeros will make it difficult to quickly recognize a displayed figure. The larger the number of digits, the more difficult becomes such recognition. If a twenty-digit system is used, for example, a calculated result "5" is displayed as "000000000 00000000005." In the case where a calculated result "0.5001" is to be displayed with the aid of numerical indicator tubes each incorporating an electrode for indicating a decimal point, such a display as "000 . . . 0.5001" will be obtained. In this case, other zeros than the zero in the position corresponding to that one of the digits on the left hand side of the decimal point which is closest to the latter and the zeros between "5" and "1" are invalid or unnecessary zeros.

Accordingly, a primary object of this invention is to provide a novel numerical display system adapted for display of calculated results through use of a plurality of numerical indicator tubes, wherein any invalid or unnecessary zero or zeros are prevented from being displayed.

Another object of this invention is to provide a novel numerical display system adapted for achieving a static and parallel numerical display of calculated results through use of a plurality of numerical indicator tubes, wherein any invalid or unnecessary zero or zeros are prevented from being displayed.

A further object of this invention is to provide a numerical display system adapted for achieving static and parallel numerical display of calculated results through use of a plurality of numerical indicator tubes, wherein the numerical indicator tubes corresponding to the respective digits are adapted to indicate "0" only when new logic, which will be mentioned in detail hereinafter, is applied to the circuits associated therewith, and any invalid or unnecessary zero or zeros are prevented from being displayed.

A still further object of this invention is to provide an apparatus so designed as to apply novel logic for preventing any invalid or unnecessary zero or zeros from being displayed, which will be described hereinafter, to the circuits associated with those electrodes of the numerical indicator tubes corresponding to the respective digits which are adapted for indicating "0."

Other objects, features and advantages of this invention will become apparent from the following detailed description made in conjunction with the accompanying drawings.

Description of preferred embodiment

Figure 1:
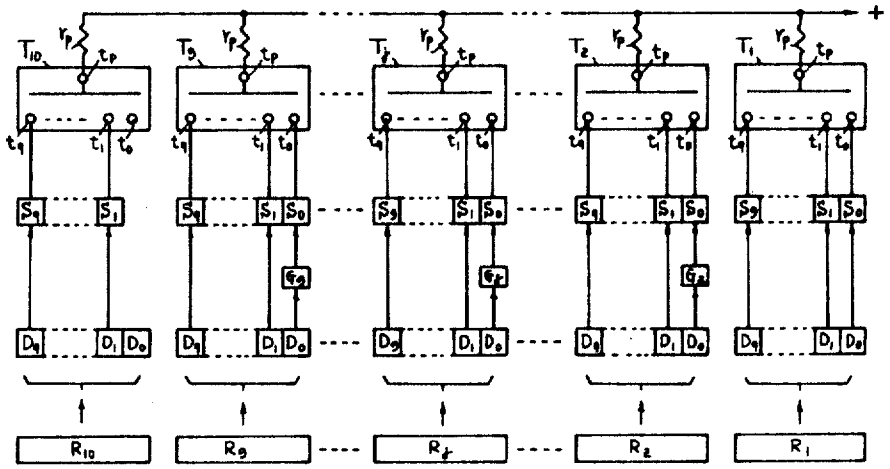
FIGURE 1 is a schematic view illustrating an embodiment of the numerical display system according to this invention, which is adapted for display of figures which do not contain the decimal point.

First, an embodiment of this invention will be described with reference to FIGURES 1, 2A, 2B and 2C, which is adapted for effecting display of figures which do not include the decimal point. FIGURE 1 shows the case where ten-digit display is to be made. $T_1, T_2 \ldots T_{10}$ represent numerical indicator tubes, such as "NIXIE Tubes," related to the 1st digit, 2nd digit . . . 10th digit, respectively. Each of the tubes includes cathode electrodes $t_0, t_1, t_2 \ldots t_9$ which are adapted for indicating such numerals as "0," "1," "2" . . . "9" respectively, and a plate electrode $t_p$ common to these cathodes. Each of the plates of the respective tubes is connected with a positive power source through a resistor $r_p$, and the cathodes $t_0, t_1, t_2 \ldots t_9$ are connected with switch circuits $S_0, S_1, S_2 \ldots S_9$, respectively. In this case, there is no need to provide such a switch circuit $S_0$ for the cathode $t_0$ of the most significant or 10th digit tube, and therefore it is not shown in the drawing. These switch circuits are designed so that when each of them is operated, the corresponding cathode is grounded.

$R_1, R_2 \ldots R_{10}$ denote digit registers related to the tubes $T_1, T_2 \ldots T_{10}$, respectively, and these digit registers are adapted so that the contents in the respective digits are statically and parallelly stored therein. As well-known in the art, each of these digit registers uses four flip-flop circuits which are provided with weights of 8, 4, 2 and 1 in the decimal number, respectively. Furthermore, these registers are so designed as to effect storage in the ordinary "8–4–2–1" binary-coded decimal digit system. Also, "yes" and "no" outputs are produced by the flip-flop circuit providing the weight 8 of each register. These "yes" and "no" outputs are represented by $A(8)$ and $A(\bar{8})$ for convenience, respectively. Similarly, "yes" and "no" outputs $A(4)$ and $A(\bar{4})$ are produced by each flip-flop circuit providing the weight 4, $A(2)$ and $A(\bar{2})$ by each flip-flop circuit providing the weight 2, and $A(1)$ and $A(\bar{1})$ by each flip-flop circuit providing the weight 1. The outputs of the respective digit registers are supplied to decoders $D_0, D_1, D_2 \ldots D_9$ for the decimal digits 0, 1, 2 . . . 9 which are associated with the cathodes $t_0, t_1, t_2 \ldots t_9$, respectively. The logic functions D(0), D(1), D(2) . . . D(9) of the decoders $D_0$, $D_1$, $D_2$ . . . $D_9$ are given by $$D(0)=A(\overline{1})\cdot A(\overline{2})\cdot A(\overline{4})\cdot A(\overline{8})$$
$$D(1)=A(1)\cdot A(\overline{2})\cdot A(\overline{4})\cdot A(\overline{8})$$
$$D(2)=A(\overline{1})\cdot A(2)\cdot A(\overline{4})\cdot A(\overline{8})$$
$$D(3)=A(1)\cdot A(2)\cdot A(\overline{4})\cdot A(\overline{8})$$
$$D(4)=A(\overline{1})\cdot A(\overline{2})\cdot A(4)\cdot A(\overline{8})$$
$$D(5)=A(1)\cdot A(\overline{2})\cdot A(4)\cdot A(\overline{8})$$
$$D(6)=A(\overline{1})\cdot A(2)\cdot A(4)\cdot A(\overline{8})$$
$$D(7)=A(1)\cdot A(2)\cdot A(4)\cdot A(\overline{8})$$
$$D(8)=A(\overline{1})\cdot A(\overline{2})\cdot A(\overline{4})\cdot A(8)$$
$$D(9)=A(1)\cdot A(\overline{2})\cdot A(\overline{4})\cdot A(8) \qquad (1)$$

From this, it is seen that if the content of each digit register is the decimal digit 5, for example, an output is produced by the decoder $D_5$. If the content is the decimal digit 0, an output is produced by the decoder $D_0$. The decoders $D_1$, $D_2$ . . . $D_9$ except the decoder $D_0$ are connected with the corresponding switch circuits $S_1$, $S_2$ . . . $S_9$, respectively. Consequently, when the logic functions described above are obtained in the respective decoders, these logic functions are applied to the corresponding switch circuits, with the result that the corresponding cathodes are grounded, thus effecting numerical display. If an output is produced by the decoder $D_5$, the switch $S_5$ is operated, so that "5" is displayed by the cathode $t_5$. On the other hand, the decoders $D_0$ related to the 2nd, 3rd . . . 9th digits are connected with the switch circuits $S_0$ through gate circuits $G_2$, $G_3$ . . . $G_9$, respectively. The 1st digit decoder $D_0$ is connected with the switch circuits $S_0$ not through the gate circuit. Each of these gate circuits is provided for the purpose of preventing invalid or unnecessary "0" from being displayed. In the case where the logic function D(0) described above is obtained in the decoder $D_0$ and in turn it is applied to the switch circuit $S_0$ as it is, the cathode $t_0$ is grounded, so that "0" will be displayed. Therefore, the gate circuits are so designed that even when the logic function D(0) is obtained, that is, even when "0" is to be displayed, the switch circuit $S_0$ is rendered inoperative if this "0" is invalid or unnecessary one. The logic function for this purpose can be obtained by applying a special logic condition to the logic function D(0). This special logic condition will be represented by "MASK" hereinafter. Thus the required logic function D'(0) is defined as follows:

$$D'(0)=A(\overline{1})\cdot A(\overline{2})\cdot A(\overline{4})\cdot A(\overline{8})\cdot \text{MASK} \qquad (2)$$
$$=D(0)\cdot \text{MASK}$$

where the content of "MASK" varies dependent upon the digit.

While it has been assumed in the foregoing that the outputs of the digit registers related to the respective digits are represented by A(8) and $A(\overline{8})$, A(4) and $A(\overline{4})$, A(2) and $A(\overline{2})$ and A(1) and $A(\overline{1})$, let it be assumed in this case by taking into consideration each digit that the outputs of the digit registers related to the 2nd digit are given by A(2–8) and $A(\overline{2-8})$, A(2–4) and $A(\overline{2-4})$, A(2–2) and $A(\overline{2-2})$ and A(2–1) and $A(\overline{2-1})$, those of the outputs of the digit registers related to the 2nd digit and $A(\overline{3-4})$, (3–2) and $A(\overline{3-2})$ and A(3–1) and $A(\overline{3-1})$ . . . . Furthermore, while it has been assumed in the foregoing that the logic function of the gate circuit is generally represented by D'(0), let it be assumed that the logic function of the gate $G_2$ related to the 2nd digit is given by D'(2–0), that of the 3rd digit by D'(3–0) . . . , by taking into consideration each digit likewise.

Since the switch circuit $S_0$ for the 10th digit is omitted so that "0" in the 10th digit may not be displayed, the logic condition "MASK" is not required to be applied to the logic function D'(10–0). Therefore, the following relation can be obtained $$\text{MASK}(10)=0 \qquad (3\text{–}10)$$

When the 10th digit is "0," the display of the 9th digit "0" is not required. Therefore, MASK(9) related to the logic D'(9–0) of the gate circuit $G_9$ associated with the 9th digit is given by $$\text{MASK}(9)=A(\overline{10-1})\cdot A(\overline{10-2})\cdot A(\overline{10-4})\cdot A(\overline{10-8})$$
$$=A(10-1)+A(10-2)+A(10-4)+A(\overline{10-8})$$
$$=D(\overline{10-0}) \qquad (3\text{–}9)$$

In the case where the 9th and 10th digits are "0," the display of the 8th digit "0" is not required, and therefore the following equation holds $$\text{MASK}(8)=A(9-1)+A(9-2)+A(9-4)+A(9-8)+\text{MASK}(9)$$
$$=D(\overline{9-0})+\text{MASK}(9) \qquad (3\text{–}8)$$

Similarly, $$\text{MASK}(7)=D(\overline{8-0})+\text{MASK}(8) \qquad (3\text{–}7)$$
$$\text{MASK}(6)=D(\overline{7-0})+\text{MASK}(7) \qquad (3\text{–}6)$$
$$\vdots$$
$$\text{MASK}(2)=D(\overline{3-0})+\text{MASK}(3) \qquad (3\text{–}2)$$

From this, the logic functions of the gate circuits related to the respective digits are derived as follows:

$$D'(9-0)=A(\overline{9-1})\cdot A(\overline{9-2})\cdot A(\overline{9-4})\cdot A(\overline{9-8})\cdot\text{MASK}(9)$$
$$D'(8-0)=A(\overline{8-1})\cdot A(\overline{8-2})\cdot A(\overline{8-4})\cdot A(\overline{8-8})\cdot\text{MASK}(8)$$
$$\vdots \qquad (4)$$
$$D'(2-0)=A(\overline{2-1})\cdot A(\overline{2-2})\cdot A(\overline{2-4})\cdot A(\overline{2-8})\cdot\text{MASK}(2)$$

Suppose that the following relationship holds true $$A(\overline{9-1})\cdot A(\overline{9-2})\cdot A(\overline{9-4})\cdot A(\overline{9-8})=D(9-0)$$
$$A(\overline{8-1})\cdot A(\overline{8-2})\cdot A(\overline{8-4})\cdot A(\overline{8-8})=D(8-0)$$
$$A(\overline{7-1})\cdot A(\overline{7-2})\cdot A(\overline{7-4})\cdot A(\overline{7-8})=D(7-0)$$
$$A(\overline{6-1})\cdot A(\overline{6-2})\cdot A(\overline{6-4})\cdot A(\overline{6-8})=D(6-0)$$
$$A(\overline{5-1})\cdot A(\overline{5-2})\cdot A(\overline{5-4})\cdot A(\overline{5-8})=D(5-0) \qquad (5)$$
$$A(\overline{4-1})\cdot A(\overline{4-2})\cdot A(\overline{4-4})\cdot A(\overline{4-8})=D(4-0)$$
$$A(\overline{3-1})\cdot A(\overline{3-2})\cdot A(\overline{3-4})\cdot A(\overline{3-8})=D(3-0)$$
$$A(\overline{2-1})\cdot A(\overline{2-2})\cdot A(\overline{2-4})\cdot A(\overline{2-8})=D(2-0)$$

then Equation 4 can be rearranged as follows:

$$D'(9-0)=D(9-0)\cdot\text{MASK}(9)$$
$$D'(8-0)=D(8-0)\cdot\text{MASK}(8)$$
$$D'(7-0)=D(7-9)\cdot\text{MASK}(7)$$
$$D'(6-0)=D(6-0)\cdot\text{MASK}(6) \qquad (6)$$
$$D'(5-0)=D(5-0)\cdot\text{MASK}(5)$$
$$D'(4-0)=D(4-0)\cdot\text{MASK}(4)$$
$$D'(3-0)=D(3-0)\cdot\text{MASK}(3)$$
$$D'(2-0)=D(2-0)\cdot\text{MASK}(2)$$

This yields the following relationship $$D'(9-0)=D(\overline{9-0})\cdot D(\overline{10-0})$$
$$D'(8-0)=D(8-0)\cdot\{D(\overline{10-0})+D(\overline{9-0})\}$$
$$D'(7-0)=D(7-0)\cdot\{D(\overline{10-0})+D(\overline{9-0})+D(\overline{8-0})\}$$
$$\vdots$$
$$D'(2-0)=D(\overline{2-0})\cdot\{D(\overline{10-0})+D(\overline{9-0})\ \ldots\ D(\overline{3-0})\}$$

Figure 2A:
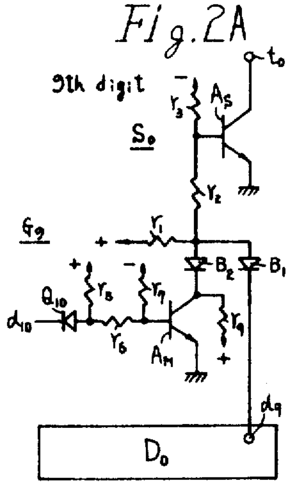
FIGURES 2A, 2B and 2C are schematic circuit diagrams each showing a portion of the embodiment shown in FIGURE 1.
Figure 2B:
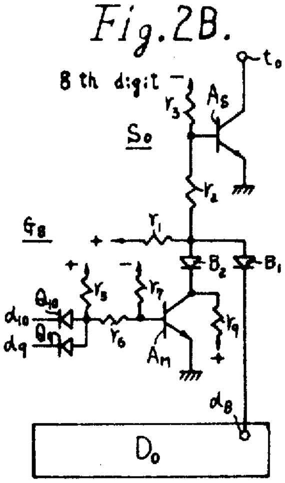
Figure 2C:
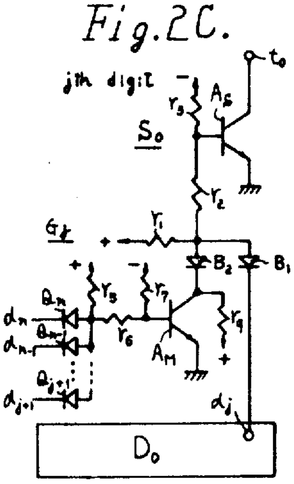

FIGURES 2A, 2B and 2C illustrate examples of the circuit for operating the switch circuits $S_0$ associated with the respective digits in accordance with the aforementioned logic functions of the gate circuits. FIGURE 2A shows such a circuit related to the 9th digit. The cathode $t_0$ of the 9th digit numerical indicator tube $T_9$ is grounded through an N-P-N transistor $A_S$ which constitutes the switch circuit $S_0$. The output terminal $d_9$ of the decoder $D_0$ is connected with the cathode of a diode $B_1$ connected in reverse polarity. The plate of the diode $B_1$ is connected with a positive power source through a resistor $r_1$ and it is connected with the base of the transistor $A_S$ through a series resistor $r_2$. $r_3$ is a bias resistor of the transistor. The output terminal $d_{10}$ (not shown) of the 10th digit decoder $D_0$ is connected with the cathode of a diode $Q_{10}$ connected in reverse polarity, and the plate of the latter is connected with the positive power source through a resistor $r_5$ and with the base of a transistor $A_M$ through a resistor $r_6$. $r_7$ is a bias resistor. The emitter of the transistor $A_M$ is grounded and its collector is connected with the positive power source through a resistor $r_9$. Also, the collector of the transistor $A_M$ is connected with the cathode of a diode $B_2$ of which plate is connected with the cathode of the diode $B_1$. In this way, the gate $G_9$ and switch circuit $S_0$ are constructed which are associated with the cathode $t_0$ of the 9th digit indicator tube.

Consequently, if an output such as, for example, +6 v. (this output is produced by decoding the decimal digit "0") appears at the output terminal $d_9$ of the 9th digit decoder $D_0$, the diode $B_1$ is rendered non-conductive. On the other hand, if an output such as, for example, + 6 v. appears at the output terminal $d_{10}$ of the 10th digit decoder $D_0$, the diode $Q_{10}$ is rendered non-conductive. Thus, the transistor $A_M$ turns "on," with the result that a voltage drop is not produced across the resistor $r_5$, thus rendering the diode $B_2$ conductive and preventing the transistor $A_S$ from turning "on" with the result that a voltage drop is obtained across the resistor $r_1$. From this, it is seen that if an output is produced by the 10th digit decoder when an output is produced by the 9th digit decoder $D_0$, "0" is not indicated on the 9th digit indicator tube $T_9$. On the other hand, if 10th digit decoder $D_0$ does not produce an output when an output is produced by the 9th digit decoder $D_0$ (in this case, a numeral other than "0" is indicated on the 10th digit indicator tube), the diode $Q_{10}$ is rendered conductive, the transistor $A_M$ is caused to turn "off" and diode $B_2$ is rendered non-conductive (the diode $B_1$ is in the non-conductive state), so that the transistor $A_S$ is caused to turn "on," thus enabling the 9th digit tube $T_9$ to display "0."

FIGURE 2B shows such a circuit related to the 8th digit, wherein the switch circuit $S_0$ may be similar to the 9th digit switch circuit. The gate circuit $G_8$ includes a diode $Q_9$ in addition to the elements of the gate circuit $G_9$, the gate circuit $G_8$ being similar to the gate circuit $G_9$ with the exception that the cathode of the diode $Q_9$ is connected with the cathode of the diode $Q_{10}$, that the plate of the diode $Q_9$ is connected with the output terminal $d_9$ of the 9th digit decoder $D_9$, and that the output terminal $d_8$ of the 8th digit decoder $D_0$ is connected with the cathode of the diode $B_1$. Therefore, the portions corresponding to those of FIGURE 2A are indicated by similar reference numerals, and detailed explanation thereof is omitted.

From the foregoing, it will be seen that if outputs are obtained at the output terminals $d_9$ and $d_{10}$ of the 9th digit and 10th digit decoders when an output appears at the output terminal $d_8$ of the 8th digit decoder, the transistor $A_S$ is caused to be "off," so that the 8th digit "0" is not displayed. However, if an output does not exist at either one of the terminals of the 9th digit and 10th digit decoders $D_0$, the transistor $A_M$ is caused to turn "off" while the transistor $A_S$ is made to turn "on," so that the 8th digit "0" may be displayed.

Although such circuits associated with the other digits (except the 1st digit) are not shown in the drawings, it will be readily understood that when an output is produced by the decoder $D_0$ related to a certain digit, "0" in this digit is not displayed if outputs are produced by all the decoders related to the more significant digits, while if any one of the decoders related to the more significant digits does not produce its output, "0" in said certain digit is displayed. The 1st digit "0" is displayed if the content of the 1st digit register is "0" in the decimal number even if the more significant digits are "0." Thus, invalid or unnecessary "0" or "0's" are prevented from being displayed.

While the ten-digit display has been described in the foregoing, it is to be understood that the following logic can be used to effect $n$-digit display in which "0" is generally indicated on the indicator tube related to the $j$th digit ($j=2, 3 \ldots (n-1)$). That is, the logic can be the product of $X(j)$ and $\text{MASK}(j)$ where $X(j)$ represents the logic function of the $j$th digit decoder and MASK-$(j)$ denotes the logic function "MASK" for the $j$th digit $(\text{MASK})\ (j)=\overline{X}(n)+\overline{X}(n-1)+\ldots\overline{X}(j+1)$. Use of such logic causes "0" or "0's" to be prevented from being displayed by other factors than the logic product of $X(j)$ and $\text{MASK}(j)$. This means that invalid or unnecessary "0" or "0's" are not displayed.

FIGURE 2C shows a circuit corresponding to those as shown in FIGURES 2A and 2B, which is associated with the "0" indicating cathode $t_0$ of the $j$th digit indicator tube $T_j$.

While display of figures in which the decimal point is not included has been described in the foregoing, explanation will now be made as to display of figures in which the decimal point is contained, with reference to FIGURES 3 and 4.

Figure 3:
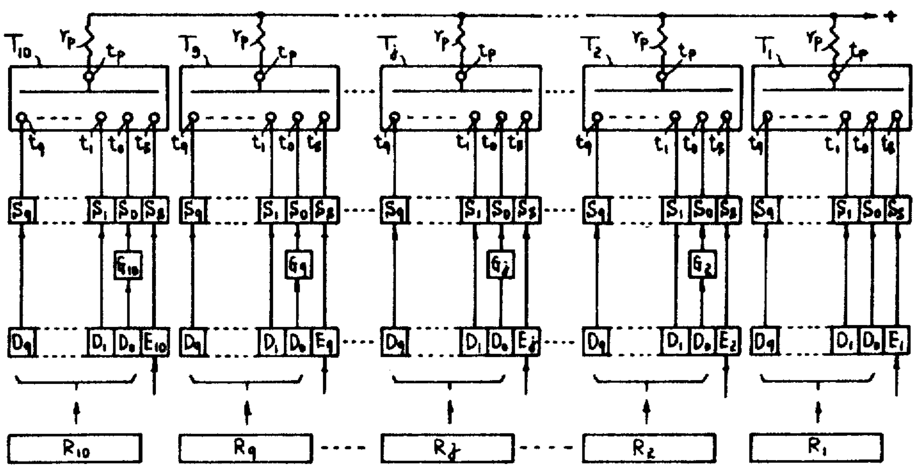
FIGURE 3 is a schematic view illustrating another embodiment of the numerical display system according to this invention, which is adapted for display of figures containing the decimal point.

FIGURE 3 shows the case where the 10-digit display is to be made. The embodiment as shown in FIGURE 3 includes numerical indicator tubes $T_1$, $T_2 \ldots T_{10}$ each having electrodes (cathodes) for indicating such numerals as "0," "1," "2" . . . "9" and a decimal point indicating electrode $t_S$. The decimal point is ordinarily indicated at the lower right hand side position of a numeral, as viewed from the front. The decimal point electrodes $t_S$ related to the respective digits are connected with switch circuits $S_S$ which are connected with decimal point decoders which are in turn connected with decimal point counter (not shown). The decoders associated with the 1st digit, 2nd digit . . . 10th digit decimal point electrodes $t_S$ are represented by $E_1$, $E_2 \ldots E_{10}$. If the content of the decimal point counter is "8," the decoder $E_8$ produces an output which operates the switch circuit $S_S$ to cause the 8th digit electrode $t_S$ to be grounded, with a result that the decimal point is indicated at the lower right hand side position of the displayed 8th digit numeral. The electrodes $t_0$–$t_9$ of the indicator tubes are connected with the switch circuits $S_0$–$S_9$, respectively, as is the case with the embodiment described above with reference to FIGURE 1. The 2nd digit, 3rd digit . . . 10th digit switch circuits $S_0$ are connected with the decoders $D_0$ through the gate circuits $G_2$, $G_3 \ldots G_{10}$, respectively. The 1st digit decoder $D_0$ is connected with the switch circuit $S_0$ not through the gate circuit. Furthermore, the switch circuits $S_1$–$S_9$ for each digit are connected with the decoders $D_1$–$D_9$, respectively. The 1st digit . . . 10th digit decoders $D_0$–$D_9$ are connected with digit registers $R_1$–$R_{10}$ for the 1st digit–10th digit, respectfully. It is to be noted, however, that the gate circuits $G_2$–$G_{10}$ are different from those as illustrated in FIGURE 1 in respect to the construction thereof. That is, these gate circuits are so designed as to prevent invalid or unnecessary "0" or "0's" from being displayed, by combining the content of the decimal point counter with the logic which has been described with reference to FIGURE 1.

Suppose that the content of the decimal point counter is "10," the decimal point is indicated on the 10th digit tube $T_{10}$. In this case, if the content of the 10th digit register is the decimal digit "0," this "0" should be displayed.

On the assumption that a logic function $C(10)$ is produced when the content of the decimal counter is "10,"

that is, when an output is produced by the 10th digit decoder $E_{10}$, the logic function corresponding to MASK(10) in equation described above in conjunction with FIGURE 1 is given by $$\text{MASK}(10)=C(10) \qquad (3\text{–}10)'$$

Similarly, MASK'(9) corresponding to MASK(9) in Equation (3–9) is obtained as follows, on the assumption that the logic function C(9) is produced when the content of the decimal counter is "9."

$$\begin{aligned}\text{MASK}'(9)&=D(\overline{10\text{–}0})+C(10)+C(9)\\&=D(\overline{10\text{–}0})+\text{MASK}'(10)+C(9) \qquad (3\text{–}9)'\end{aligned}$$

Assuming that logic function C(8), C(7) . . . or C(1) is produced when the content of the decimal counter is "8," "7," . . . or "1," respectively, the following relations hold:

$$\begin{aligned}\text{MASK}'(8)&=D(\overline{9\text{–}0})+\text{MASK}'(9)+C(8) \qquad (3\text{–}8)'\\\text{MASK}'(7)&=D(\overline{8\text{–}0})+\text{MASK}'(8)+C(7) \qquad (3\text{–}7)'\\\text{MASK}'(6)&=D(\overline{7\text{–}0})+\text{MASK}'(7)+C(6) \qquad (3\text{–}6)'\\\text{MASK}'(5)&=D(\overline{6\text{–}0})+\text{MASK}'(6)+C(5) \qquad (3\text{–}5)'\\\text{MASK}'(4)&=D(\overline{5\text{–}0})+\text{MASK}'(5)+C(4) \qquad (3\text{–}4)'\\\text{MASK}'(3)&=D(\overline{4\text{–}0})+\text{MASK}'(4)+C(3) \qquad (3\text{–}3)'\\\text{MASK}'(2)&=D(\overline{3\text{–}0})+\text{MASK}'(3)+C(2) \qquad (3\text{–}2)'\end{aligned}$$

Rearranging the above relations so as to correspond to Equation 6 yields $$\begin{aligned}D''(10\text{–}0)&=D(10\text{–}0)\cdot\text{MASK}'(10)\\D''(9\text{–}0)&=D(9\text{–}0)\cdot\text{MASK}'(9)\\D''(8\text{–}0)&=D(8\text{–}0)\cdot\text{MASK}'(8)\\D''(7\text{–}0)&=D(7\text{–}0)\cdot\text{MASK}'(7)\\D''(6\text{–}0)&=D(6\text{–}0)\cdot\text{MASK}'(6) \qquad (6)'\\D''(5\text{–}0)&=D(5\text{–}0)\cdot\text{MASK}'(5)\\D''(4\text{–}0)&=D(4\text{–}0)\cdot\text{MASK}'(4)\\D''(3\text{–}0)&=D(3\text{–}0)\cdot\text{MASK}'(3)\\D''(2\text{–}0)&=D(2\text{–}0)\cdot\text{MASK}'(2)\end{aligned}$$

Figures 4, 5, 6:
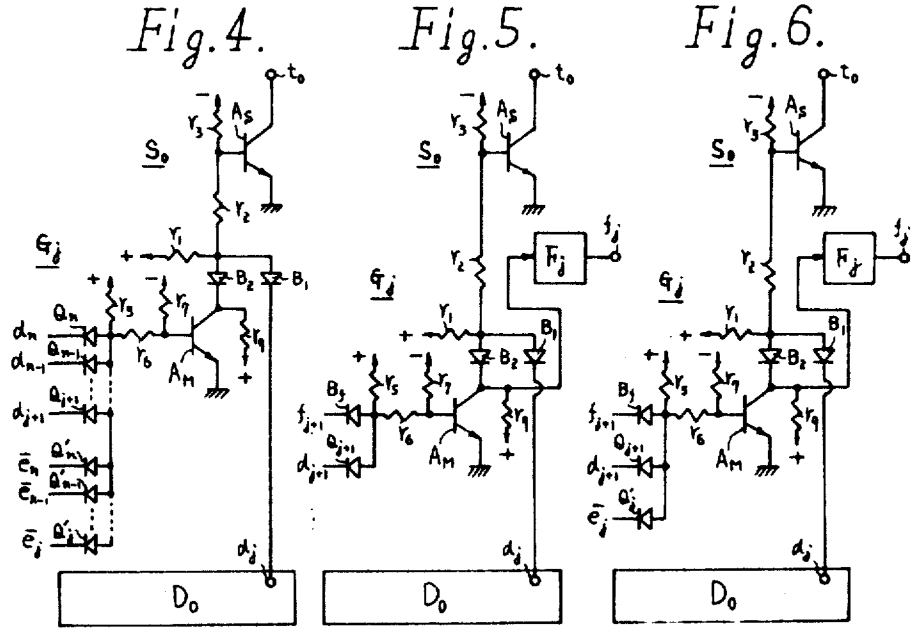
FIGURE 4 is a schematic circuit diagram showing a part of the embodiment as illustrated in FIGURE 3.
FIGURE 5 is another schematic circuit diagram showing a portion of the embodiment as shown in FIGURE 1, which is adapted for effecting display of figures which do not contain the decimal point.
FIGURE 6 is another circuit diagram showing a part of the embodiment as shown in FIGURE 3 for achieving display of figures including the decimal point.

FIGURE 4 illustrates a practical circuit adapted for driving the switch circuits $S_0$ for the respective digits in accordance with the logic functions of the gate circuits for the respective digits, the circuit as shown therein being associated with the "0" indicating electrode $t_0$ of the $j$th digit indicator tube $T_j$. The example of FIGURE 4 corresponds to that of FIGURE 2C, the former being similar to the latter with the exception that the former includes diodes $Q_n'$, $Q_{n-1}'$ . . . $Q_j'$ of which cathodes are connected with each other and with the cathodes of diodes $Q_n$, $Q_{n-1}$ . . . $Q_{j+1}$. To the plates of the diodes $Q_n'$, $Q_{n-1}'$ . . . $Q_j$ are connected with the "no" output terminals $\overline{e}_n$, $\overline{e}_{n-1}$ . . . $\overline{e}_j$ of decimal point decoders $E_n$, $E_{n-1}$ . . . $E_j$, respectively. The other portions of FIGURE 4 which correspond to FIGURE 2C are indicated by similar reference numerals and detailed explanation thereof is omitted.

In accordance with the arrangement described above, if the content of the decimal point counter is less than $(j-1)$ in the decimal number, invalid or unnecessary "0" is not indicated on the $j$th digit tube $T_j$ by virtue of the same operation as described with reference to FIGURES 1, 2A, 2B and 2C. If the content of the decimal point counter is $j$ or larger, one of the diodes $Q_n'$–$Q_j'$ is rendered conductive, the transistor $A_M$ is caused to turn "off" and the diode $B_2$ is made "off," so that the transistor $A_S$ is made to turn "on," thus effecting "0" display.

In accordance with the aforementioned arrangement, therefore, in an attempt to effect display of a figure containing the decimal point, "0" or "0's" in all of the more significant digits than the digit in which the decimal point is indicated are prevented from being displayed, thereby suppressing or eliminating invalid or unnecessary "0" or "0's."

FIGURE 3 shows the case where ten-digit display is to be carried out. Generally, when it is desired that display of figures including the decimal point be achieved through use of $n$ numerical indicator tubes, the following logic can be utilized for the purpose of enabling "0" to be indicated on the $j$th digit indicator tube. That is, such a purpose can be achieved by the use of the logic product of the logic function $X(j)$ and $$\text{MASK}(j)=(\overline{X}(n)+\overline{X}(n-1)+\ .\ .\ .\ \overline{X}(j+1))+(C(n)+C(n-1)+\ .\ .\ .\ C(j))$$

where $C(j)$ $(j=2, 3\ .\ .\ .\ n)$ represents in the general form the logic content of the decimal counter. In this way, "0" display is effected only by the logic product of $X(j)$ and $\text{MASK}(j)$. This means that when display of a figure containing the decimal point is to be effected, invalid or unnecessary "0" or "0's" are prevented from being displayed.

FIGURE 5 shows another circuit corresponding to the embodiment of FIGURE 2C, which is adapted for display of figures which do not include the decimal point. Those portions of the circuit shown in FIGURE 5 which correspond to FIGURE 2C are represented by similar reference numeral, and detailed explanation thereof is omitted. In the embodiment of FIGURE 5, a terminal $f_j$ is connected wtih the collector of the transistor $A_M$ through a suitable inverting transistor circuit $F_j$. In FIGURE 2C, there have been provided the dodes $Q_n$, $Q_{n-1}$ . . . $Q_{j+1}$ connected with the output terminals $d_n$, $d_{n-1}$ . . . $d_{j+1}$ of the $n$th digit, $(n-1)$st digit . . . $(j+1)$st digit decoders, whereas the embodiment of FIGURE 5 includes a diode $B_f$ connected with the $(j+1)$st digit terminal $f_{j+1}$ and a diode $Q_{j+1}$ connected with the output terminal $d_{j+1}$ of the $(j+1)$st digit decoder $D_0$. Thus, by virtue of the fact that the terminal $f_{j+1}$ is connected with the diode $B_f$, the latter can provide for the same effect as that produced by the diodes $Q_n$–$Q_{j+2}$.

Consequently, the embodiment as illustrated in FIGURE 5 performs the same function as that of FIGURE 2C, so that invalid or unnecessary zero or zeros can be prevented from being displayed according to the same logic as described with reference to FIGURE 1.

FIGURE 6 shows another circuit corresponding to FIGURE 4, which is adapted for display of figures containing the decimal point. Those portions of the circuit shown in FIGURE 6 which correspond to FIGURE 4 are represented by the similar reference numerals and characters, and detailed description thereof is omitted. In FIGURE 6, the terminal $f_j$ is connected with the collector of the transistor $A_M$ through the inverting transistor circuit $F_j$, as is the case with FIGURE 5. Further, the circuit of FIGURE 6 is similar to that of FIGURE 5 in respect to inclusion of diode $B_f$ connected with the terminal $f_{j+1}$ for the $(j+1)$st digit and the diode $Q_{j+1}$ connected with the output terminal $d_{j+1}$ of the $(j+1)$st digit decoder. In the circuit of FIGURE 6, diode $Q_j'$ connected with the "no" output terminal $\overline{e}_j$ of the $j$th digit decoder $E_j$ is provided in place of the diodes $Q_n'$–$Q_j'$ connected with the terminals $\overline{e}_n$, $\overline{e}_{n-1}$ . . . $\overline{e}_j$ in FIGURE 4.

Thus, as described above with reference to FIGURE 5, the diode $B_f$ can perform the same function as that carried out by the diodes $Q_n$–$Q_{j+2}$ inclusive by virtue of the fact that it is connected with the terminals $f_{j+1}$. Also, the diode $Q_j'$ can achieve the same function as that performed by the diodes $Q_n'$–$Q_j'$ inclusive in FIGURE 4. Thus, the embodiment of FIGURE 6 can produce the same effect as given by that of FIGURE 4, so that invalid or unnecessary zero or zeros can be prevented from being displayed in accordance with the same logic as described above in conjunction with FIGURE 3.

While preferred embodiments of this invention have been described in detail, it should be understood that this invention is not restricted to such embodiments. Also, it is to be noted that various changes and modifications can be made with respect to the circutis as illustrated in FIGURES 2C, 4 to 6 which are capable of realizing the novel features of this invention, without departing from the scope and spirit of this invention.

What is claimed is:

1. A numerical display system for a computer or the like, comprising $n$ numerical indicator tubes adapted for $n$ digit display, each of said indicator tubes being provided with first electrodes for indicating such decimal numbers as 0, 1, 2 . . . 9 and a second electrode common to said first electrodes, $n$ digit registers associated with said $n$ indicator tubes respectively, each of said digit registers being adapted for storage of a content of each digit, decoders for decoding the content of each of said digit registers, said decoders being associated wtih said first electrodes respectively, and means associated with the "0" indicating electrodes of said first electrodes of said indicator tubes, said means being so designed as to enable the $j$th digit indicator tube to display the decimal number 0 when the logic product of the logic $X(j)$ of the decoder corresponding to the 0 indicating electrode of the $j$th digit indicator tube and the logic MASK($j$) is obtained, where said MASK($j$) is represented by $$\text{MASK}(j)=X(n)+X(n-1)+\ .\ .\ .\ X(j+1)$$

(where $j=2, 3$ . . . $(n-1)$) for display in which the decimal point is not included.

2. A numerical display system for a computer or the like, comprising $n$ numerical indicator tubes adapted for $n$ digit display, each of said indicator tubes being provided with first electrodes for indicating such decimal numbers as 0, 1, 2 . . . 9, a decimal point indicating electrode, and a second electrode common to said first electrodes and the decimal point indicating electrode, $n$ digit registers associated with said $n$ indicator tubes respectively, each of said digit regiters being adapted for storage of a content of each digit, decoders for decoding the content of each of said digit registers, said decoders being associated with said first electrodes respectively, a decimal point counter, decimal point decoders for decoding the content of said decimal point counter, said decimal point decoders being associated with said decimal point indicating electrode of said indicator tubes respectfully, and means associated with the "0" indicating electrodes of said first electrodes of said indicator tubes, said means being so designed as to enable the $j$th digit indicator tube to display the decimal number 0 when the logic product of the logic $X(j)$ of the decoder corresponding to the 0 indicating electrode of the $j$th digit indicator tube and the logic MASK($j$) is obtained, where said MASK($j$) is represented by $$\text{MASK}(j)=X(n)+X(n-1)+\ .\ .\ .\ X(j+1)+C(n)+C(n-1)+\ .\ .\ .\ C(j)$$

(where $j=2, 3$ . . . $n$) for display in which the decimal point is included, where $C(j)$ is represented the logic corresponding to the content of said decimal point counter.

3. A numerical display system for displaying a number by means of a plurality of sequentially arranged numerical indicator elements and in which the display of unnecessary zeroes is prevented, said system comprising a plurality of sequentially arranged numerical indicator elements each adapted to selectively display decimal digit numbers at a respective digit position, each of said indicator elements being provided with an electrode for each digit to be displayed, switch means associated with each of said electrodes of at least all of the indicator elements at digit positions lower than the most significant digit position and with at least the electrodes corresponding to the digit numbers 1 through 9 in the indicator element at said most significant digit position for selectively activating the respective electrodes, decoder means associaated with each of said electrodes for closing said switch means associated with the respective electrode when an output appears at the respective decoder means, and gate means interposed between each of said switch and decoder means controlling an electrode adapted to display the decimal zero at least at all digit positions lower than said most significant position and higher than the least significant digit position, each said gate means being interconnected with the zero decoder means at more significant digit positions and being operative to permit the display of a decimal zero at the respective digit position only in the absence of an output from at least one of said zero decoder means at more significant digit positions thereby indicating an indicator element is displaying a digit other than zero at least at one of said more significant positions.

4. A numerical display system in accordance with claim 3, wherein said gate means are provided for only said indicator elements at the digit positions lower than said most significant position and higher than said least significant position.

5. A numerical display system in accordance with claim 4, wherein said indicator element at said most significant position has said switch means associated only with its said electrodes corresponding to the digit numbers 1 through 9.

6. A numerical display system in accordance with claim 5, wherein each indicator element has associated therewith a digit register for activating said decoder means associated with said indicator element.

7. A numerical display system in accordance with claim 3, wherein said numerical indicator elements are each also provided with an electrode for displaying a decimal point.

8. A numerical display system in accordance with claim 7, wherein additional decoder means are associated with each of said decimal electrodes, and switch means associated with each of said decimal electrodes and adapted to be closed by the respective decoder means.

9. A numerical display system in accordance with claim 8, wherein said additional decoder means are connected to a counter, and said counter activates the appropriate decoder means to determine the position of said decimal point.

10. A numerical display system for displaying a number by means of sequentially arranged numerical indicator elements and in which the display of unnecessary zeros is prevented, said system comprising $n$ sequentially arranged numerical indicator elements each adapted to selectively display decimal digit numbers from zero to 9, each of said indicator elements being provided with an electrode for each digit to be displayed, decimal electrodes associated with each of said indicator elements for indicating decimals, switch means associated with each of said electrodes of each of said indicator elements for selectively activating said electrodes, decoder means associated with each of said switch means for closing said associated switch means, register means associated with each of indicator elements for activating said zero to 9 digit decoders, counter means interconnected with said decimal point decoders for determining the position of said decimal point in said display, and gate means interposed between each of said zero electrode activating switches and the respective decoder means associated with the 2nd through $n$ indicator elements, said gate means being responsive to said zero and decimal decoder means to prevent the display of unnecessary zeros.

References Cited

UNITED STATES PATENTS

| | | | |
|---|---|---|---|
| 3,346,853 | 10/1967 | Koster et al. | 340—172.5 |
| 3,307,156 | 2/1967 | Durr | 340—172.5 |
| 3,267,262 | 8/1966 | Stuart | 340—172.5 |
| 3,248,705 | 4/1966 | Dammann | 340—172.5 |
| 3,241,120 | 3/1966 | Amdahl | 340—172.5 |
| 3,107,342 | 10/1963 | Estrems et al. | 340—172.5 |

GARETH D. SHAW, Primary Examiner

U.S. Cl. X.R.

235—156, 166, 171